United States Patent
Krishnasamy et al.

(10) Patent No.: US 10,789,029 B2
(45) Date of Patent: Sep. 29, 2020

(54) SYSTEMS AND METHODS FOR MANAGING ONE OR MORE INCOMPLETE JOBS IN A MULTI-FUNCTION DEVICE

(71) Applicant: XEROX CORPORATION, Norwalk, CT (US)

(72) Inventors: Muralidaran Krishnasamy, Chennai (IN); Narayan Kesavan, Chennai (IN); Sathish Kumar Annamalai Thangaraj, Chennai (IN)

(73) Assignee: Xerox Corporation, Norwalk, CT (US)

(*) Notice: Subject to any disclaimer, the term of this patent is extended or adjusted under 35 U.S.C. 154(b) by 0 days.

(21) Appl. No.: 16/162,771

(22) Filed: Oct. 17, 2018

(65) Prior Publication Data
US 2020/0125310 A1    Apr. 23, 2020

(51) Int. Cl.
*G06F 3/12* (2006.01)
*H04N 1/00* (2006.01)

(52) U.S. Cl.
CPC .......... *G06F 3/1258* (2013.01); *G06F 3/1205* (2013.01); *G06F 3/1259* (2013.01); *G06F 3/1267* (2013.01); *H04N 1/00477* (2013.01); *H04N 1/00482* (2013.01)

(58) Field of Classification Search
None
See application file for complete search history.

(56) References Cited

U.S. PATENT DOCUMENTS

| 2009/0086266 A1* | 4/2009 | Nakashima ............ G06K 15/02 358/1.15 |
| 2009/0279136 A1* | 11/2009 | Kanno .................... G06F 3/121 358/1.15 |
| 2012/0120439 A1* | 5/2012 | Minagawa ............ G06F 3/1208 358/1.15 |
| 2017/0052745 A1* | 2/2017 | Kanematsu ........... G06F 3/1263 |
| 2017/0371601 A1* | 12/2017 | Kaneko .............. H04N 1/00233 |
| 2018/0032017 A1* | 2/2018 | Sakaguchi ......... G03G 15/0855 |

\* cited by examiner

*Primary Examiner* — Henok Shiferaw
(74) *Attorney, Agent, or Firm* — Jones Robb, PLLC

(57) ABSTRACT

The disclosure discloses methods and systems for managing one or more incomplete jobs in a multi-function device. The method includes checking a stored profile of a user for a previously stored incomplete job when the user logs in into the multi-function device or a networked multi-function device. Based on the check, it is further checked if the previous incomplete job is compatible with configuration of the logged-in multi-function device. Then, based on the check, a user interface is presented with the previous incomplete job along with one or more options related to the previous incomplete job. The user is allowed to select an option of the one or more options, the one or more options allow the user to take an action related to the previous incomplete job. Finally, the previous incomplete job is executed in accordance with the selection.

21 Claims, 9 Drawing Sheets

SYSTEMS AND METHODS FOR MANAGING ONE OR MORE INCOMPLETE JOBS IN A MULTI-FUNCTION DEVICE

TECHNICAL FIELD

The present disclosure relates to the field of imaging, more specifically, relates to methods and systems for managing one or more incomplete jobs in a multi-function device.

BACKGROUND

Multi-function devices provide the capabilities of multiple machines in a single unit such as printing, scanning, copying and faxing. Typically, users submit print jobs to the multi-function devices via their computing devices such as a laptop, while some users submit print jobs, scan or copy jobs directly to the multi-function devices. While submitting jobs, the users provide various job parameters such as color print, monochrome print, staple, duplex, simplex, and so on. Based on these job parameters, the multi-function devices execute the job and complete the job successfully.

However, there are scenarios when a user's job is abruptly terminated, deleted, partially completed or completed but with errors, due to various reasons. For example, a multi-function device restarts when the currently running job is in the "held" state. In another example, finishing consumables are unavailable which leads to the job getting delivered without finishing, i.e., partially completed. In a further example, accidental manual deletion of the job by the user before it is completed. In all such scenarios, the job is not completed in the desired manner and the user has no option other than to re-submit the job along with the job parameters from scratch. Currently, there are no methods and systems available for the user to resume, restart or finish the previous incomplete job with minimal effort. Therefore, there is a need for simple and efficient methods and systems that allow the user to handle the incomplete job with minimal effort.

SUMMARY

According to aspects illustrated herein, a method of operating a multi-function device capable of processing a plurality of jobs is disclosed. The method includes receiving a job from a user along with one or more job attributes. The job is received by the multi-function device. Then, a completion status of the job is determined based on the one or more job attributes. If the job is determined as incomplete, information about the incomplete job including completion details, the incomplete job and the one or more job attributes are stored against a profile of the user.

According to other aspects illustrated herein, a method for managing/handling one or more incomplete jobs in a multi-function device, is disclosed. The method includes checking a stored profile of a user for a previously stored incomplete job when the user logs in into the multi-function device or a networked multi-function device. Based on the check, it is further checked if the previous incomplete job is compatible with configuration of the logged-in multi-function device. Then, based on the check, a user interface is presented with the previous incomplete job along with one or more options related to the previous incomplete job. The user is allowed to select an option of the one or more options, the one or more options allow the user to take an action related to the previous incomplete job. Finally, the previous incomplete job is executed in accordance with the selected option. In this manner, the previous incomplete job is handled without requiring the user to re-configure the previous incomplete job.

According to further aspects illustrated herein, a multi-function device is disclosed. The multi-function device includes a receiver, a job controller, a database and a user interface. The receiver is configured for receiving a job from a user along with one or more job attributes. The job controller is configured for determining a completion status of the job based on the one or more job attributes. The database is configured for storing completion details of the job, the job and the one or more job attributes against a profile of the user, when the job is determined as an incomplete job. The user interface is configured for presenting the incomplete job to the user along with one or more actionable options, when the user logs in into the multi-function device or a networked multi-function device and allowing the user to take an action on the presented incomplete job, based on the one or more actionable options.

According to additional aspects here, a method of operating a multi-function device is disclosed. The method includes determining a completion status of a received job based on one or more job attributes of the job. The completion details of the job, the job and the one or more job attributes are stored against a profile of a user, when the job is determined as incomplete. A login into the multi-function device or a networked multi-function device is detected. The profile of the user is checked for the incomplete job. Then, it is checked if the incomplete job is compatible with configuration of the logged-in multi-function device. Based on the check, a user interface is presented, displaying the incomplete job along with one or more actionable options related to the incomplete job. A selection of an actionable option of the one or more actionable options is received. Finally, the incomplete job is executed in accordance with the selection.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1A:
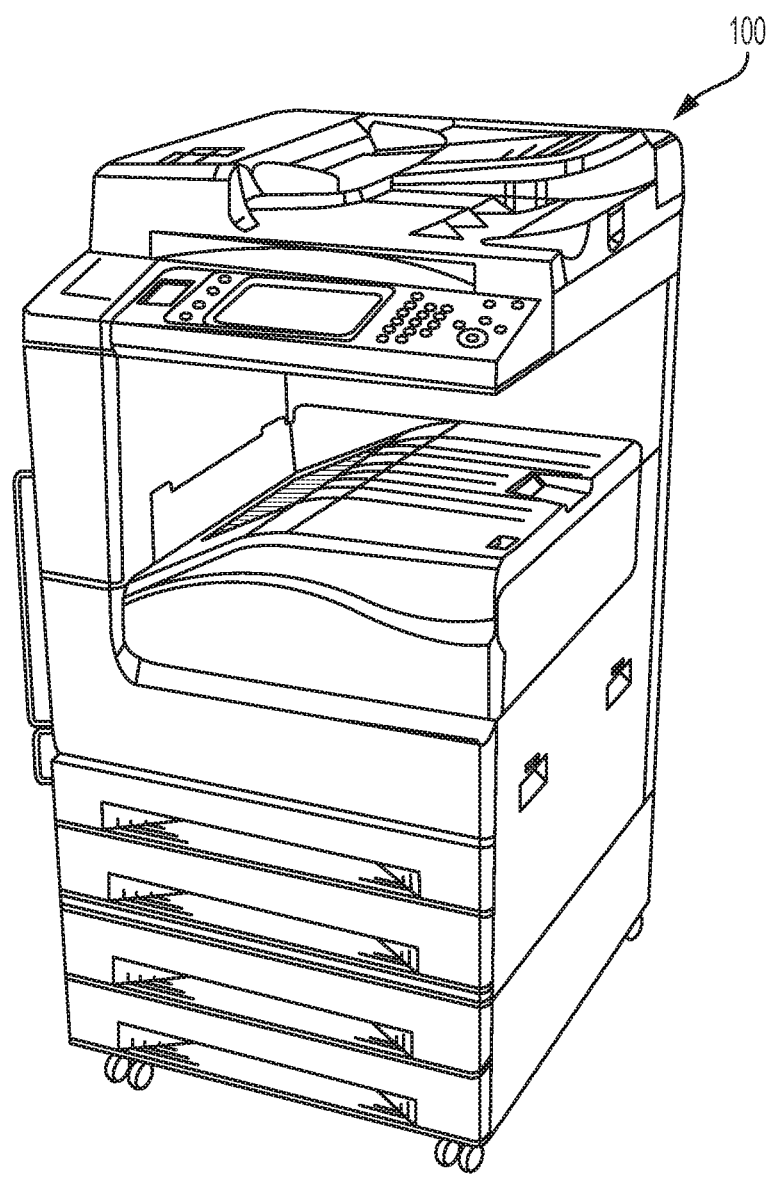
FIG. 1A shows an exemplary physical multi-function device.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

Definitions of one or more terms that will be used in this disclosure are described below without limitations. For a person skilled in the art, it is understood that the definitions are provided just for the sake of clarity and are intended to include more examples than just provided below.

The term "multi-function device" refers to a device or a combination of multiple devices configured to perform one or more functions, but not limited to, scanning, printing, copying, faxing, imaging, and so forth. The multi-function device includes software, hardware, firmware, or a combination thereof. In context of the current disclosure, the multi-function device manages one or more incomplete jobs. Specifically, the multi-function device stores one or more incomplete jobs and associated details, provides users with multiple options to handle the one or more incomplete jobs and further processes/executes the one or more incomplete jobs based on the user selected option.

The term "job" includes a print job, a scan job, a fax job, a copy job or a combination thereof. The job includes a document and is associated with one or more job attributes. For example, a print job may have different job attributes than a copy job. Any job is considered complete when the job is executed in accordance with all the job attributes or when the job is not interrupted/held/terminated in the middle of execution.

The term "job attributes" include parameters basis which the job is executed. The job attributes are submitted by the user either via a print driver or via a user interface of the multi-function device.

The term "incomplete job" is the job executed partially or is not completed successfully in accordance with all the job attributes. Further, the job is referred to as an incomplete job when the job is interrupted, when the job is put in held state, when the job is abruptly terminated or accidently deleted in the middle of execution. The job remains incomplete due to one or more scenarios. For instance, the job is considered incomplete when the multi-function device restarts accidently in the middle of executing the job. The job may remain incomplete due to unavailability of sufficient media for printing the job. The incomplete job may be termed as a "previous incomplete job", a "partially completed job" or a "failed job."

The term "completion details" refer to a progress of the incomplete job, i.e., portions of the job which are completed and the portions of the job which are not completed.

The term "next time" refers to a time when the user logs in again into the multi-same function device or a networked multi-function device, after the user logs out from the multi-function device when the job remains incomplete and the incomplete job is stored. The user is logged-in into the same multi-function device or the networked multi-function device to check his previously stored incomplete job or for new/other jobs submitted by the user. For example, at a time A the user submits his job for printing to a multi-function device, but the job remains incomplete due to various scenarios and the user logs out from the multi-function device. Once logged out, the user logs in into the same multi-function device at a different time B, the time B is considered as the next time as the user is logged-in into the multi-function device after the job is considered incomplete and stored for later retrieval and use.

The term "same multi-function device" refers to a multi-function device where the user has submitted the job for execution, but the job remains incomplete due to one or more scenarios and the incomplete job is stored by the multi-function device. The "networked multi-function device" refers to a multi-function device coupled to the multi-function device where the user has submitted the job for execution.

The term "profile" includes details related to a user such as a username, a password, his preferences, history and other details that help identifying the user. In context of the current disclosure, the profile further stores information about the incomplete job including the incomplete job, the completion details of the incomplete job, and the one or more job attributes so that the user does not require to re-submit the job and/or the job attributes. The incomplete job, the completion details and the job attributes are stored till the user takes an action on the incomplete job.

The term "configuring" defines submitting the job and the job attributes to the multi-function device. The configuring also includes programming the job such as a page description language (PDL) document.

The term "computing device" refers to device that the user typically uses for giving print commands. Examples of the computing device include, but are not limited to, a personal computer, a laptop, a mobile phone, a tablet, a Personal Digital Assistant (PDA), a smart-phone or any other device capable of data communication.

Exemplary Embodiments

According to aspects illustrated herein, a method of operating a multi-function device capable of processing a plurality of jobs is disclosed. The method includes receiving a job from a user along with one or more job attributes. The job is received by the multi-function device. Then, a completion status of the job is determined based on the one or more job attributes. If the job is determined as incomplete, information about the incomplete job including completion details, the incomplete job and the one or more job attributes are stored against a profile of the user.

The method includes tagging the job as incomplete based on the determination. Here, storing the completion details includes storing completed portions of the incomplete job and storing incomplete portions of the incomplete job. The method includes displaying the information about the incomplete job to the user via a user interface, enabling the user to take a user action on the incomplete job, when the user logs in into the same multi-function device or a networked multi-function device. The multi-function device may be the same multi-function device where the user has submitted the job for execution. The multi-function device may be a networked device, i.e., a multi-function device communicatively coupled to the multi-function device where the user has submitted the job for execution. The method includes performing at least one of executing the incomplete job again, executing only incomplete portions of the incomplete job, removing the incomplete job from the user profile and skipping a notification related to the incomplete job. The stored information about the incomplete job is used for at least one of executing the incomplete job again and executing only incomplete portions of the incomplete job.

According to other aspects illustrated herein, a method for managing/handling one or more incomplete jobs in a multi-function device, is disclosed. The method includes checking a stored profile of a user for a previously stored incomplete job when the user logs in into the multi-function device or a networked multi-function device. Based on the check, it is further checked if the previous incomplete job is compatible with configuration of the logged-in multi-function device. Then, based on the check, a user interface is presented with the previous incomplete job along with one or more options related to the previous incomplete job. The user is allowed to select an option of the one or more options, the one or more options allow the user to take an action related to the previous incomplete job. Finally, the previous incomplete job is executed in accordance with the selected option. In this manner, the previous incomplete job is handled without requiring the user to re-configure the previous incomplete job.

The method includes storing the previous incomplete job, one or more job attributes, and completion details of the previous incomplete job against the profile of the user. The previous incomplete job, the one or more job attributes and the completion details are stored only for the previous incomplete job. The one or more options include a resume option, a restart option, a remove option and an ignore option. The resume option includes executing only incomplete portions of the previous incomplete job. The restart option includes executing the previous incomplete job again. The remove option includes removing the previous incomplete job from the profile of the user. The ignore option includes skipping a notification related to the incomplete job.

According to further aspects illustrated here, a multi-function device is disclosed. The multi-function device includes a receiver, a job controller, a database and a user interface. The receiver is configured for receiving a job from a user along with one or more job attributes. The job controller is configured for determining a completion status of the job based on the one or more job attributes. The database is configured for storing completion details of the job, the job and the one or more job attributes against a profile of the user, when the job is determined as an incomplete job. The user interface is configured for presenting the incomplete job to the user along with one or more actionable options, when the user logs in into the multi-function device or a networked multi-function device and allowing the user to take an action on the presented incomplete job based on the one or more actionable options.

The job controller is configured for tagging the job as an incomplete job based on the determination. The one or more actionable options include a resume option, a restart option, a remove option and an ignore option. The job controller is configured for executing only incomplete portions of the incomplete job. The job controller is configured for executing the incomplete job again. The job controller is configured for removing the incomplete job from the profile of the user. The job controller is configured for skipping a notification related to the incomplete job. The one or more job attributes and the completion details of the incomplete job are stored only for the incomplete job. The job controller is configured for checking whether the incomplete job is compatible with configuration of the logged-in multi-function device, before presenting the incomplete job to the user.

According to additional aspects herein, a method of operating a multi-function device is disclosed. The method includes determining a completion status of a received job based on one or more job attributes of the job. The completion details of the job, the job and the one or more job attributes are stored against a profile of a user, when the job is determined as incomplete. A login into the same multi-function device or a networked multi-function device is detected. The profile of the user is checked for the incomplete job. Then, it is checked if the incomplete job is compatible with configuration of the logged-in multi-function device. Based on the check, a user interface is presented, displaying the incomplete job along with one or more actionable options related to the incomplete job. A selection of an actionable option of the one or more actionable options is received. Finally, the incomplete job is executed in accordance with the selection.

The one or more actionable options include a resume option, a restart option, a remove option and an ignore option.

Overview

At the time of job execution, commonly seen scenarios include machine restarts, insufficient papers, unavailability of finishing options, etc., and ultimately the job remains incomplete due to the occurrence of such scenarios. To successfully complete the job, the user requires to re-submit the job and corresponding job attributes. This consumes a lot of time and effort of the user when the job includes a large document. And there are no effective methods and systems allowing the user to restart, resume or finish the previously incomplete job without requiring him to re-configure it or re-submit it. To address such scenarios, the present disclosure discloses methods and systems for managing one or more incomplete jobs. To this end, the disclosure introduces the feature of storing information/details about the incomplete job, the information includes the incomplete job, completion details and job attributes as a part of a user profile. These details are stored or maintained until the user takes a user action on the stored incomplete job. Various actions which the user can take include resuming the incomplete job, restarting the incomplete job, removing the incomplete job and skipping a notification related to the incomplete job. The user can take any of the actions directly at the multi-function device or a networked multi-function device when the user logs in into the same multi-function device or the networked multi-function device. In this manner, the incomplete job is handled without requiring the user to re-submit or re-configure the incomplete job.

For simplicity, the present disclosure will be discussed with respect to a print job without limiting the scope of the disclosure. But, the disclosure can be extended to a scan job, a copy job, or a fax job. The disclosure will further be discussed with respect to a single incomplete job of a user, however, the disclosure can be implemented for more than one incomplete job of the user. Accordingly, it is understood that the disclosure can be implemented for any number of users having one or more incomplete jobs stored in their profile.

The present disclosure directs to an improvement in handling jobs which are left incomplete due to various reasons or scenarios and is not directed to generic components performing conventional activities. Moreover, the multi-function device is not a generic device/component but performs specific activities and outputs tangible results, which are more than abstract items. The disclosure helps in reducing human efforts and time, provides a quick and easy access to the incomplete job via a user interface with an overall addition of ease to handle the incomplete job and all of these can be accounted as the much more than the abstract items. The claimed methodology leads to improvement in functionality of a computer by configuring a multi-function device to manage/handle incomplete jobs. Moreover, the claimed methodology is not merely making use of generic computer and is targeted towards a specific physical machine, i.e., hardware multi-function device.

As an example, the multi-function device stores details associated with an incomplete job, including the incomplete job itself, job attributes and completion details. The stored details are used for handling the incomplete job at the multi-function device. The multi-function device further provides multiple options to the user to handle the incomplete job such as a resume option, a restart option, a remove/delete option and an ignore option. The user can select any of the options to handle the incomplete job and based on the user selection, the multi-function device executes the incomplete job and provides an output such as a printed document, if the job is a print job. The multiple options provided to the user via the user interface makes the overall process simple, easy and further adds convenience for the user to handle the incomplete job. In operation, the improved methods and systems include a front-end feature and a back-end feature, the front-end feature provides multiple options to the user via the user interface and the back-end feature includes storage of the incomplete job and associated details of the incomplete job.

Exemplary Physical Multi-Function Device and Environments

FIG. 1A shows an exemplary real physical multi-function device 100 that is configured to manage one or more incomplete jobs. A user typically submits a job and corresponding job attributes to the multi-function device 100. The multi-function device 100 initiates executing the job. In the middle of execution, the job may get terminated or halted due to one or more scenarios and the job remains incomplete. In context of the current disclosure, the multi-function device 100 stores information about the incomplete job including the incomplete job, completion details and the job attributes related to the incomplete job, for later retrieval and use. The details are stored as a part of a profile of the user. When the user logs in into the same multi-function device, i.e., the multi-function device 100 or a networked multi-function device, i.e., a multi-function device coupled to the multi-function device 100, the incomplete job is retrieved from the user profile and is presented to the user with various options, via a user interface. Other details such as the completion details and the job attributes may be presented to the user. The user selects an option to handle the incomplete job. Based on the user selection, the multi-function device 100 executes the incomplete job in accordance with the selection. In this manner, the incomplete job can be handled with minimal effort.

The multi-function device 100 includes various components required for implementing the present disclosure and this will be discussed below in more detail.

Figure 1B:
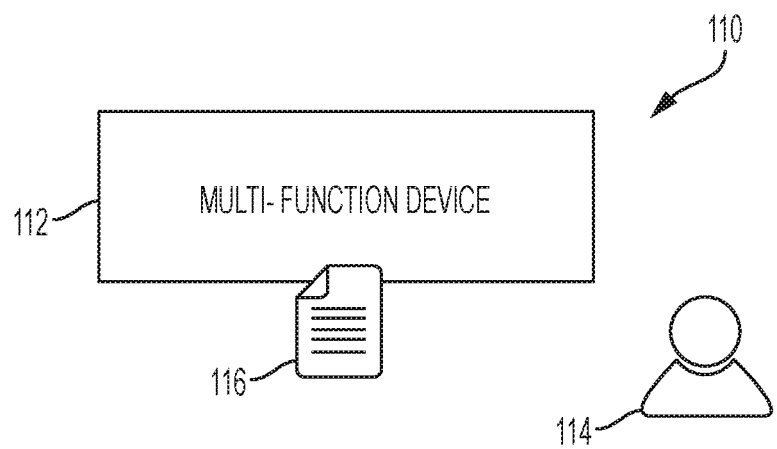
FIGS. 1B and 1C illustrate exemplary environments in which various embodiments of the disclosure can be practiced.

FIG. 1B is an exemplary environment 110 in which various embodiments of the disclosure can be practiced. In the environment 110, a single multi-function device 112, a user 114, and a job 116 are shown. Various examples of the multi-function device 112 include, but not limited to, a multi-function printer, a scanner, a copier, a printer, a multi-function peripheral device, or the like. The environment 110 may optionally include a computing device (although not shown). Examples of the computing device may include a personal computer, a laptop, a mobile phone, a tablet, a PDA, a smart-phone or any other device capable of data communication. The multi-function device 112 receives the job 116 such as a print job, for printing via the computing device. In other examples, the multi-function device 112 may receive the job 116 for printing via a Universal Serial Bus (USB), via a network, via a memory of the multi-function device 112 and so on.

The job 116 includes a document for printing and one or more job attributes. The job 116 may include any MS office document such as a word document, a ppt, an excel, etc., a PDF document, and so on. The job 116 may include a page description language (PDL) document such as PostScript (PS), Portable Document Format (PDF) and Extensible Markup Language (XML) Paper Specification (XPS). The PDL document may include information about fonts, graphics, and the like that describe the appearance of the document present within the print job and may include a set of programming language commands or specifications for processing the document based on the information. The PDL document may include job attributes for executing the job 116.

The document represents any document related to the user 114 such as a text book, a research document, a project document, thesis, a journal, a report, a user guide, and so forth. The document may be a large-sized document containing multiple pages or may be a small-sized document. The document may or may not have page numbers. The document is of a pre-defined size such as A4 size. However, the document may be of sizes such as A2, A3, A5 and others without limiting the scope of the disclosure. The document includes one or more pages, each page having content. The content can be in the form of text, images, graphics or a combination thereof. The document may optionally include a heading and an index.

The job attributes include information/parameters required for executing the job 116, for example, printing the document. Various examples of the job attributes may include media type, output tray, color print, black & white print, number of copies, finishing options, output printer, and so on. For executing the job 116, a number of resources such as media, finishers, tray, etc., are required.

As shown, the user 114 uses the multi-function device 112 for his day-to-day activities such as printing the job 116, scanning the job 116, copying the job 116, faxing the job 116, imaging and so forth. In context of the current disclosure, the multi-function device 112 manages one or more incomplete jobs. The multi-function device 112 receives the job 116 as submitted by the user 114 and the job 116 remains incomplete due to one or more scenarios. The job 116 now represents an incomplete job. Information about the incomplete job 116 is stored locally with the multi-function device 112.

To handle the incomplete job 116, the user 114 requires to login into the same multi-function device 112 or another but networked multi-function device. Upon log-in, the multi-function device 112 checks a profile of the user 114 for any stored incomplete jobs. Based on the check, the multi-function device 112 presents the incomplete job 116 along with multiple options to the user 114 to handle the incomplete job 116. Various options include restart, resume, remove/delete or skip. In this manner, the multi-function device 112 allows the user 114 to manage the incomplete job 116 without requiring him to re-configure the job 116 and further allows the user 114 to handle the incomplete job 116 with minimal effort.

A list of incomplete jobs and options are presented to the user 114 based on the configuration of the multi-function device 112. For instance, if the user logs in into the multi-function device 112 and the multi-function device 112 does not support finishing options, then the incomplete job 116 in his profile that requires finishing options may not be displayed to the user 114 at that point. Each time when the job 116 of the user 114 remains incomplete due to one or more scenarios, the multi-function device 112 follows-up with the user 114 to take an action related to the incomplete job 116 when the user 114 logs in into the multi-function device 112 or a networked multi-function device.

Figure 1C:
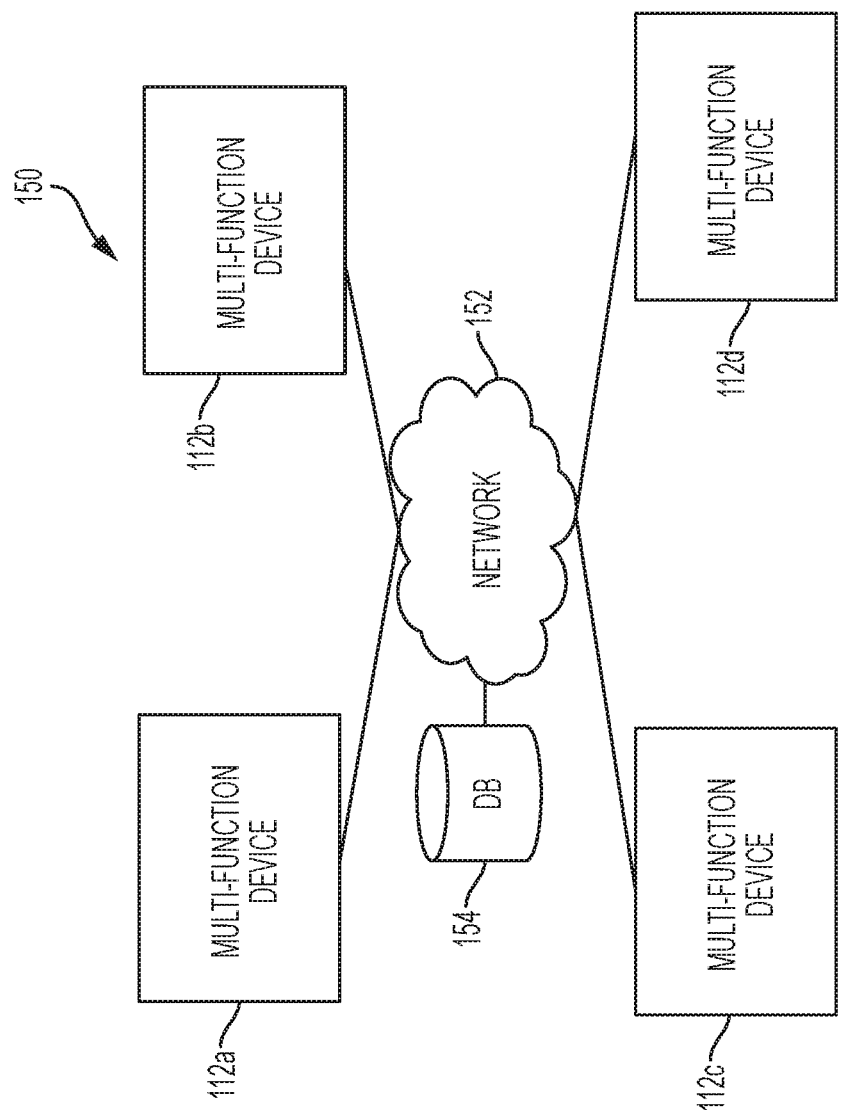

FIG. 1C shows another exemplary environment 150 in which multiple multi-function devices 112a, 112b, 112c, and 112d (collectively, 112) are connected to each other via a network 152. Each multi-function device 112 is further connected to a database 154 over the network 152. The network 152 may be a wired network, a wireless network or a combination of these. The network 152 may be an individual network or a collection of many such individual networks, interconnected with each other and functioning as a single large network, e.g., the Internet or an intranet. The network 152 may be implemented as one of the different types of networks, such as intranet, local area network (LAN), wide area network (WAN), the internet, near field communication (NFC), and such networks. The network 152 may either be a dedicated network or a shared network, which represents an association of the different types of networks that use a variety of protocols. The network 152 may include network devices, such as network switches, hubs, routers, HBAs, for providing a communication link between the multi-function device 112a and other connected devices/systems such as the multi-function device 112d.

The database 154 stores completion details of the job 116, the incomplete job 116, and the one or more job attributes. The database 154 is connected over the network 152 that can be accessed by any connected multi-function device 112a, 112b, 112c and 112d. This way, all details related to the incomplete job 116 can be retrieved when the user 114 logs in into any of the multi-function device 112a, 112b, 112c and 112d.

As shown, the multi-function devices 112 may be similar in software and/or hardware configuration. For example, all multi-function devices 112 may support finishing options and may include multiple output trays. In other examples, the multi-function devices 112 may have different software and/or hardware configuration. For instance, the multi-function device 112a may support finishing option, while the multi-function device 112d may not support finishing option. In another example, the multi-function device 112c may only be able to print black & white, while the multi-function device 112b may produce color prints.

It can be considered that the user 114 submits the job 116 to the multi-function device 112a. The job 116 remains incomplete due to one or more scenarios (will be discussed below in detail in FIG. 2A). To handle the incomplete job 116, the user 114 can login into any of the multi-function device 112a-112d. For example, if the user 114 logs in into the multi-function device 112a, the multi-function device 112a is referred to the same multi-function device. But if the user 114 logs in into the multi-function device 112b, the multi-function device 112b is referred to as the networked multi-function device. Similarly, if the user 114 logs in into any of the multi-function devices such as 112c and 112d, then each of the multi-function device 112c, 112d is referred to as the networked multi-function device.

In the environment 110, the incomplete job 116 and associated details are stored locally with the multi-function device 112 or in a storage device such as a database, a memory of the multi-function device 112. The incomplete job 116 and the associated details can only be accessed via the multi-function device 112. In this scenario, the user 114 requires to login into the same multi-function device, i.e., the multi-function device 112 where the user 114 has originally submitted the job 116.

In the environment 150, the incomplete job 116 and associated details are stored over the network 152, i.e., in the database 154 connected over the network 152. The incomplete job 116 and the associated details can be accessed via any of the multi-function devices 112a, 112b, 112c and 112d. In this scenario, the user 114 can login from any of the multi-function devices 112a-112d. To better understand, it can be considered that the user 114 submits the job 116 to the multi-function device 112a and the multi-function devices 112b, 112c and 112d are networked multi-function devices. Due to one or more scenarios, the job 116 remains incomplete and is stored in the database 154. To handle the incomplete job 116, the user 114 can log-in from the same multi-function device, i.e., the device 112a or any networked multi-function devices 112b, 112c and 112d to handle the incomplete job 116. The user 114 can log-in into any multi-function device 112a, 112b, 112c and 112d for purposes such as to view his job, status, handle incomplete job 116, etc.

The job 116 may be a secure job, i.e., a job requiring login details to initiate or release prints. The job 116 may be a normal job. The job 116 once determined as incomplete is stored locally or remotely over the network as discussed in FIG. 1B and FIG. 1C, respectively. To handle or access the incomplete job 116, the user 114 requires to login into a multi-function device. The multi-function device may be the same multi-function device where the user 114 has submitted the job 116. The multi-function device may be a networked multi-function device, i.e., a multi-function device connected to the multi-function device where the user 114 has submitted the print job.

In case the job 116 is a secure job, the user 114 logs in initially into the multi-function device 112a, to initiate or release the job 116. The job 116 once determined as incomplete is stored locally or remotely over the network. The user 114 logs out from the multi-function device 112a. To handle or access the incomplete job 116, the user 114 requires to login again into the same multi-function device 112a or a networked multi-function device say 112c, as mentioned above. When the user 114 logs in again into the multi-function device 112 or the networked multi-function 1112c after the user 114 logs out from the multi-function device 112a can be termed as next time log-in. Next time log-in is referred in the context when the job 116 is a secure job.

In case the job 116 is a normal job, the user 114 does not require any initial login to the multi-function device 112a. The job 116 is executed and once determined as incomplete is stored locally or remotely over the network. To handle or access the incomplete job 116, the user 114 requires to login into the same multi-function device 112a or a networked multi-function device say 112c, as mentioned above.

The present disclosure can be implemented in any of the discussed environments 110 and 150. The disclosure provides improved methods and systems to store incomplete job of a user along with completion details and job attributes and further allows a user to quickly and directly access his incomplete jobs via a user interface when the user logs in into a multi-function device. The multi-function device may be the same multi-function device where the user has submitted the job. The multi-function device may be a networked multi-function device, i.e., a multi-function device connected to the multi-function device where the user has submitted the print job. The stored details are further retrieved and used for executing the incomplete job.

Exemplary System

Figure 2A:
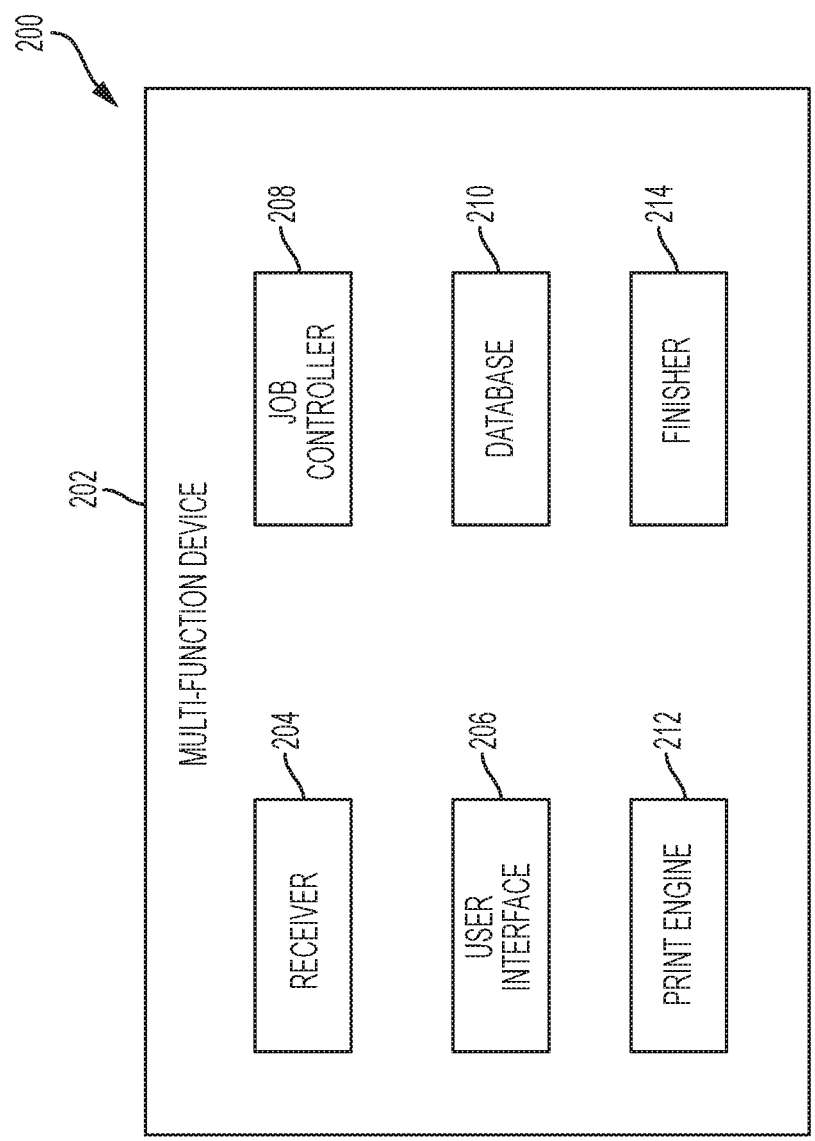
FIG. 2A is an overall block diagram of a system for managing one or more incomplete jobs.

FIG. 2A shows a block diagram of an overall system 200 for managing one or more incomplete jobs. As shown, the system 200 includes a multi-function device 202. The multi-function device 202 includes an operating system where all components reside and the operating system of the multi-function device 202 is enhanced to manage the incomplete jobs. The multi-function device 202 includes a receiver 204, a user interface 206, a job controller 208, a database 210, a print engine 212, and a finisher 214. Each of the components 204, 206, 208, 210, 212 and 214 are coupled to each other via a communication bus or later developed protocols and each of the components 204-214 communicate with each other for managing the incomplete jobs.

The multi-function device 202 may additionally include a network controller. The network controller controls the network as a whole or the multi-function device 202 or any devices/computing devices connected on the network. For example, the network controller handles any operations that involve network access and this includes the print path, the scan path, network upgrades and Simple Network Management Protocol (SNMP) services. The job controller 208 may be a print controller in case the job is a print controller. In case the job is a copy job, the job controller 208 may be termed as a copy controller. In case the job is a scan job, the job controller 208 may be a scan controller. The copy/scan controller may perform image processing including compression/decompression, image merge, rotation, etc. The copy controller may interact with the user interface 206, drive the print engine 212 or an image output terminal, interact with the scan controller, and so on. For simplicity, the controller is referred to as the job controller 208. The multi-function device 202 may include one or more additional components as required to implement the current disclosure.

The receiver 204 receives a job such as a print job for printing, in particular, the receiver 204 receives a job including a document and one or more job attributes. Example of the one or more job attributes are such as a media type (stationery sheet, etc.), an output tray (tray 1, tray 2, etc.), consumable, finishing options (staple, hole, punch, etc.), number of copies (2, 3, 5), print output type (duplex, simplex), media size (A4, A3, A5, A2, L, 2L, etc.), output quality (normal), monochrome print, color print, and so on. The document may be submitted for printing via a computing device. In such cases, the job attributes are submitted via a print driver of the computing device. The document may be submitted for printing via a Universal Serial Bus (USB). The document may be uploaded to the multi-function device 202 via the memory. The document may be uploaded to the multi-function device 202 via an external location. In all such cases, the job attributes may be submitted by the user via the user interface 206 of the multi-function device 202. The receiver 204 passes the job and the job attributes to the job controller 208 for further processing.

In case the job is a print job, the job may include a digital document. In case the job is a scan job or a copy job, the job may include a document in a physical form.

The job controller 208 receives the job and the job attributes. Before executing, the job controller 208 may check for available resources to execute the job. For example, if one of the job attributes is color print, then the job controller 208 may check whether the multi-function device 202 is capable of producing color prints. In the similar manner, the job controller 208 may check for all the available resources required to print the job. The job controller 208 starts executing the job in accordance with the job attributes. While executing the job, the job controller 208 continuously monitors the job and checks/determines its completion status. Based on the completion status, the job controller 208 tags the job either as a complete job or as an incomplete job. The job controller 208 tags the job as complete when all required resources are available to execute the job and the job is executed successfully in accordance with all the job attributes.

While executing, the job is terminated or halted in between due to one or more scenarios and the job remains incomplete. The job controller 208 tags the job as incomplete due to the one or more scenarios. Before tagging/marking the job as incomplete, the job controller 208 checks for occurrence of any the one or more scenarios. The occurrence of any such scenarios indicate the job is not executed in accordance with at least one job attribute as submitted by the user. The one or more scenarios may include accidental or manual restart/reboot of the multi-function device 202, unavailability of sufficient media and consumable, unavailability of output tray, the multi-function device 202 does not support some finishing options, accidental deletion of the job by the user, the user does not like the quality of print and holds the job, the multi-function device 202 takes decisions which are out of user requirement such as transfer the prints to an alternate tray, prints on an alternate media, and so on. The scenarios discussed here are exemplary and there can be more such scenarios due to which the job remains incomplete. The job controller 208 checks whether the job is executed in accordance with all the job attributes as received. If it is found, the job is not executed in accordance with at least one job attribute due to the one or more exemplary scenarios, the job is marked as incomplete by the job controller 208. The job hereinafter is referred to as an incomplete job. The job controller 208 then stores the incomplete job, completion details and the job attributes in the database 210 for later retrieval and use. The incomplete job, the completion details and the job attributes are stored as a part of the user profile in the database 210. If logged-in, the job controller 208 logs out the user or the user manually logs out from the multi-function device 202.

The database 210 stores profile of the user. The profile includes user credentials, his preferences and other user details required for implementing the present disclosure. The database 210 further stores all details associated with the received job. The details are deleted when the job is completed successfully. In case the job is incomplete, the database 210 maintains all details/information associated with the incomplete job. The details include the incomplete job, i.e., the document, completion details and the job attributes for later retrieval and use. The stored details are used for executing the incomplete job when the user logs in into the multi-function device 202 at a later time. The database 210 may further include a personalized job folder for the user. And when the job remains incomplete due to the one or more scenarios, the incomplete job and its printing status is added to the personalized job folder of the user for later retrieval and use. In this manner, the incomplete job and the details are stored locally in the database 210 of the multi-function device 202.

Next time or at a later time, the user logs in into the multi-function device 202 or a networked multi-function device. The networked multi-function device includes devices which are connected to the multi-function device 202 via the same network, as discussed in FIG. 1B, and will be discussed in FIG. 2B. The user may have logged-in for checking status of his new jobs or for checking the previous incomplete job.

The job controller 208 detects a login by the user, to the multi-function device 202 or the networked multi-function device. Upon log-in, the job controller 208 checks and retrieves the profile of the user. The job controller 208 checks/identifies if there is any incomplete job listed/stored against the profile of the user. If there is any incomplete job listed against the profile of the user, the job controller 208 retrieves the stored incomplete job and presents the incomplete job to the user via the user interface 206 along with one or more actionable options for the user. The one or more actionable options include a resume option, a restart option (also known as a rerun option), an ignore option and a remove option (or a delete option). The option resume allows the user to execute only the incomplete portions of the incomplete job. The option restart allows the user to begin/execute the job from the scratch/beginning. The option ignore allows the user to skip a notification prompt and take no action. The option remove allows the user to remove the incomplete job and the associated details from the profile of the user. When the user chooses to remove the incomplete job, all details including the incomplete job, the completion details and the job attributes are removed/deleted. The user selects one of the listed actionable options and based on the user selection, the job controller 208 executes the incomplete job in accordance with the selection.

For example, if the user selects the resume option, the job controller 208 beings executing the incomplete job from where it was left. To this end, the job controller 208 first identifies incomplete portions of the incomplete job and completed portions of the incomplete job. The job controller 208 finally starts executing only the incomplete portions of the incomplete job and passes the incomplete portions to the print engine 212 for successful completion. Consequently, the job controller 208 tags the incomplete job as a complete job and removes it from the profile of the user. If the user selects the restart option, the job controller 208 beings executing the job from scratch. The job controller 208 begins executing the job and passes the job to the print engine 212 for printing and for successful completion. As a result, the job controller 208 tags the incomplete job as a complete job. Finally, the job is removed from the profile of the user as the job is completed. If the user selects the remove option, the job controller 208 removes/deletes all details associated with the incomplete job. The job controller 208 removes the incomplete job, the job attributes and completion details from the profile of the user. If the user selects the skip option, the job controller 208 skips the notification of the incomplete job from the user interface 206. The user may skip the notification as the user may have logged-in for his other currently running jobs or may want to handle the previously stored incomplete job later. The details associated with the incomplete job are stored as is. In the selected option, the notification may be displayed again when the user logs in into the multi-function device 202 or the networked multi-function device again sometime later.

If the job requires any finishing, the print engine 212 passes the printed job to the finisher 214, specifically, to a specific finisher unit. The finisher 214 includes one or more units for finishing the received job. The finisher 214 receives the completed pages from the print engine 212 and provides a finished product. Few examples of the finisher 214 include a staple, a stacker, catch tray, a binder, an inserter, other output device, and so on. For example, if an inserter is required for the job, then the number of required sheets and other pertinent information is shown via the user interface 206. If a stapler is needed to complete the printed job, the number of staples is part of the information displayed via the user interface 206. If a binder is needed to complete the print job, the type and required amount of binder wire is part of the information displayed via the user interface 206. If a stacker is required to complete the print job, the required stack offset settings are displayed via the user interface 206.

The user interface 206 displays information about the incomplete job along with the one or more actionable options. The displayed information includes at least one of the incomplete job, the completion details and the job attributes. In case there are multiple incomplete jobs stored against the profile of the user, the user interface 206 displays a list of incomplete jobs to the user and one or more actionable options for the user. The user interface 206 further allows the user to select one of the actionable options to handle the incomplete job. In case of multiple incomplete jobs, the user interface 206 first allows the user to select any incomplete job he wishes to handle and then allows the user to select one of the actionable options corresponding to the selected incomplete job. The user interface 206 displays the processing and progress of all the jobs at the time of execution.

Figure 2B:
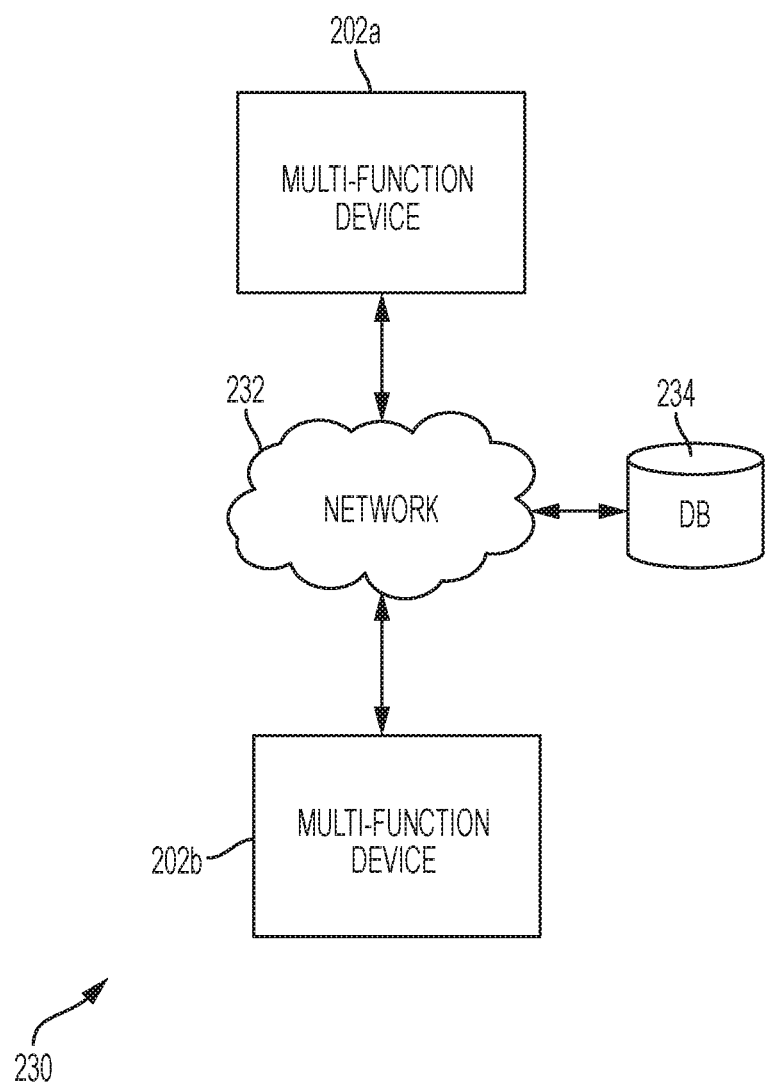
FIG. 2B shows the system connected to a database over a network.

In the embodiment of FIG. 2A, the database 210 is a part of the multi-function device 202. In other embodiments, the database 210 may not be a part of the multi-function device 202 but may be connected over a network. The same is shown in FIG. 2B. In the embodiment 230 of FIG. 2B, a database 234 is connected over a network 232 such that the details related to the incomplete job of the user can be accessed or retrieved anytime from any location. The database 234 may be an enterprise database or a cloud database. The database 234 stores profile of the user. The profile includes the user credentials, his preferences and other details required for implementing the present disclosure. The database 234 further stores all details associated with the incomplete job as discussed above. The details are deleted when the job is completed successfully. In case the job is incomplete, the database 234 maintains the details including the incomplete job, completion details and the job attributes for later retrieval and use. The stored details are used for executing the incomplete job when the user logs into the multi-function device 202 at a later time through any multi-function device, i.e., 202*a* and 202*b*.

The embodiment of FIG. 2A is implemented when a single multi-function device 202 is present in an organization. In all such scenarios, the user requires to login into the same multi-function device, i.e., the multi-function device 202 to handle the incomplete job. The multi-function device 202 retrieves the details of the incomplete job from the database 210 and presents the incomplete job along with the one or more options. The multi-function device 202 may present the completion details and the job attributes. The embodiment of FIG. 2B is implemented when there are multiple multi-function devices such as 202*a* and 202*b*, in an organization. In the embodiment of FIG. 2B, the user can login from any multi-function device such as a multi-function device 202*a*, or a multi-function device 202*b*. The multi-function device through which the user is logged-in (say the multi-function device 202*a*), contacts the database 234 and fetches details of the incomplete job from the database 234 over the network 232. The database 234 is accessible to all connected multi-function devices, i.e., the multi-function device 202*a* and multi-function device 202*b*. The incomplete job is displayed based on the configuration of the logged-in multi-function device such as the multi-function device 202*a*.

The system 200 can be implemented in multiple ways. For example, the system 200 may include a single multi-function device 202 as shown in FIG. 2A. In such cases, the multi-function device 202 performs all the functionalities for managing one or more incomplete jobs including execution, determination, checking profile, monitoring and storage details associated with the incomplete job as discussed above in detail. In another example, the system 200 may include multiple multi-function devices such as 202a and 202b, connected to each other via the suitable network 232. Each multi-function device such as 202a and 202b, is further connected to the database 234, which stores all details related to incomplete job. The details of the incomplete jobs are stored such that the details can be accessed and retrieved from any of the multi-function devices 202a, 202b. In such scenarios, each multi-function device 202a, 202b is equally capable of performing functionalities for managing the one or more incomplete jobs. While in some cases, the multi-function devices 202a and 202b may be connected to a server (although not shown) having storage capabilities. The server stores details about the incomplete job. If the user logs into any multi-function device, the logged-in multi-function device contacts the server and fetches the incomplete job details which are compatible to that specific multi-function device. In additional examples, the single multi-function device 202 may be connected to the database 210 over the network. These are just few implementation examples, the system 200 can be configured in any possible manner.

Exemplary Flowchart—Storing Incomplete Jobs

Figure 3:
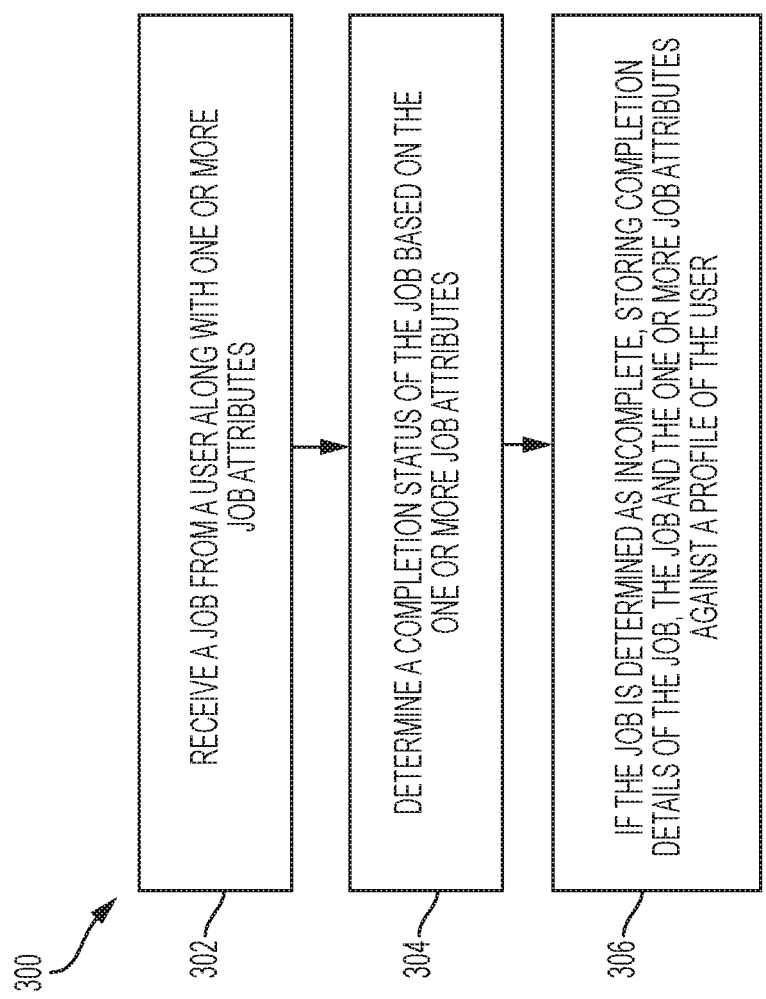
FIG. 3 is a method flowchart for storing one or more incomplete jobs.

FIG. 3 is a method flowchart 300 for managing one or more incomplete jobs. Specifically, the method flowchart 300 relates to storing one or more incomplete jobs, corresponding job attributes and completion details. The method is implemented by a multi-function device capable of processing a plurality of jobs. The method will be discussed considering one incomplete job corresponding to a single user, but the method can be executed for any number of incomplete jobs for any number of users.

The method begins when a user wishes to execute a job. The job is associated with one or more job attributes. The job may be a print job, a scan job, a copy job, or a fax job. The print job may be submitted via a computing device of a user. In such cases, the job attributes may be submitted via a print driver of the computing device. The print job may be submitted via other ways such as a Universal Serial Bus (USB). In all such cases, the job attributes may be submitted by the user directly at the multi-function device, i.e., via a user interface of the multi-function device. The scan job, fax job or the copy job may be directly submitted at the multi-function device and the job attributes may be submitted by the user via the user interface of the multi-function device.

Upon submitting the job by the user, the job is received along with the one or more job attributes at 302. The job and the one or more job attributes are received by the multi-function device. The job execution is initiated according to the one or more job attributes. The job is continuously monitored for its progress and completion status.

At 304, a completion status of the job is determined based on the one or more job attributes. The job is determined complete when the job is executed in accordance with all the job attributes as received. The job is tagged as a completed job. If the job is successfully completed, the method proceeds with conventional way. The job is determined incomplete when the job is not executed in accordance with at least one job attribute or when the job is terminated/halted/ accidently deleted/held in the middle of execution. Then, the job is tagged as an incomplete job. The job is considered incomplete when certain portions of the job are completed in accordance with the job attributes and certain portions of the job are not completed in accordance with the job attributes due to one or more scenarios as discussed above. The scenarios for determining the job as incomplete job discussed above are exemplary in nature and many variations to these can be implemented.

In case of a scan job, the scan job is considered incomplete when the multi-function device detects papers in a Single Pass Document Handler (SPDH)/platen or if the job is not transferred to a specified location. In case of a copy job, the job is considered incomplete if the multi-function device has not raised job completion status (by comparing with the job attributes set/received, the multi-function device decides the job status). Similarly, the fax job is considered incomplete when the fax job is not transferred to a specified location.

At 306, if the job is determined as incomplete, completion details of the job, the job and the one or more job attributes are stored against a profile of the user, for later retrieval and use. The stored details including the incomplete job, the one or more job attributes and the completion details are used for executing the incomplete job again and executing only incomplete portions of the incomplete job. The information/details about the incomplete job can be stored locally or remotely over a network.

The completion details indicate the progress of the incomplete job. Here, storing the completion details include storing completed portions of the incomplete job and storing incomplete portions of the incomplete job. For example, the completion details capture the portions of the job which are executed and completed, and portions of the job which are not completed. For example, a job of 5 pages is submitted for printing, where the pages to be printed are color print, duplex and staple. The completed portion of the job includes color print and duplex printed and the non-completed portion is the staple. The job, the completion details and the job attributes are stored in a standalone device or over a network such as in an enterprise database, a cloud, a server such that the details can be accessed from any multi-function device. The details are stored until the incomplete job is executed/completed successfully or the user takes an action on the incomplete job.

The incomplete job is automatically presented to the user via a user interface, enabling the user to take a user action, when the user logs in into the same multi-function device or a networked multi-function device. Here, presenting the incomplete job includes displaying information about the incomplete job including the incomplete job, the completion details and the job attributes via the user interface (FIG. 6), enabling the user to take the user action. The user action includes selecting an option a resume option, a restart option, a remove option, and a skip option to handle the incomplete job. Based on the user action, at least one step is performed including executing the incomplete job again, executing only incomplete portions of the incomplete job, remove the incomplete job from the user profile and skip a notification related to the incomplete job. For example, if the user selects the restart option, then the incomplete job is executed again. If the user selects the restart option, then only incomplete portions of the incomplete job are executed. If the user selects the remove option, then the incomplete job is removed from the profile of the user. If the user selects the skip option, then a notification related to the incomplete job is skipped. As the information about the incomplete job is stored, the stored information can be accessed for executing the incomplete job according to the selected option and hence the user does not require to re-submit the job and the attributes.

The options as discussed here are exemplary in nature and many other options to handle the incomplete job may be implemented.

Exemplary Flowcharts—Managing Incomplete Jobs

Figure 4:
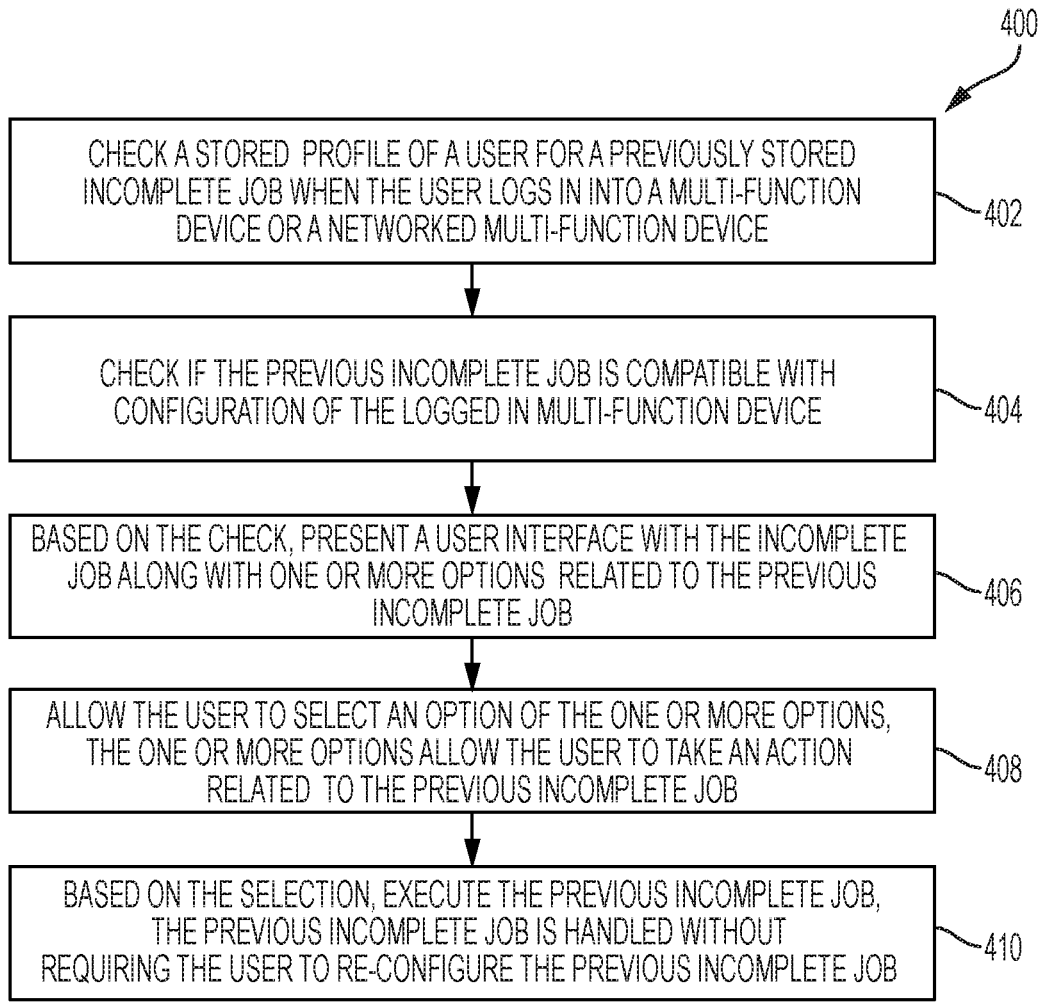
FIG. 4 is a method flowchart for managing one or more incomplete jobs in a multi-function device.

FIG. 4 is a method flowchart 400 for handling one or more previous incomplete jobs without re-configuring the one or more previous incomplete jobs. The method can be implemented by a multi-function device, a printer, a scanner, a copier, a multi-function peripheral device or any equivalent device with printing, copying, and/or scanning capabilities. The method is implemented for scenarios when one or more jobs remain incomplete due to various scenarios as discussed above. The incomplete jobs and corresponding details of the incomplete jobs are already stored. According to this method, it is considered that the one or more jobs submitted by a user earlier are determined as incomplete and details related to the incomplete jobs are already stored as discussed in FIG. 3. The method 400 of FIG. 4 focuses on managing those already stored incomplete jobs. The stored incomplete jobs can be managed when the user logs into the same multi-function device, i.e., the multi-function device where the user submitted for the job for execution. The stored incomplete jobs can be managed when the user logs in into a networked multi-function device.

The method 400 begins with when the user logs into the same multi-function device or a networked multi-function device. The user may login into the same multi-function device (the multi-function device where the user previously submitted the job for printing). The user may login into a multi-function device communicatively coupled to the multi-function device where the user previously submitted the job for printing. The user may login into the same multi-function device or the networked multi-function device to check the progress of a new print job he submitted or to view/handle the stored incomplete job.

At 402, post successful login, a stored profile of the user is retrieved and is checked for a previously stored incomplete job. If the incomplete job is stored, the method proceeds further to block 404. The profile of the user is checked if there is any incomplete job stored.

At 404, it is checked if the previous stored incomplete job is compatible with configuration of the logged-in multi-function device, i.e., the multi-function device through which the user is logged-in. The compatibility check is performed, before presenting the incomplete job to the user via the user interface. The compatibility is checked for hardware and software configuration of the logged-in multi-function device. For example, if the stored incomplete job requires finishing options such as staple but the logged-in multi-function device does not support the finishing option, then the incomplete job is not presented/displayed to the user. In another example, if the stored incomplete job requires color prints and the logged-in multi-function device is capable of producing color prints, the methods proceeds further with displaying the incomplete job to the user.

In case there are multiple incomplete jobs stored against the profile of the user, the list of incomplete jobs and options are presented to the user depend on the configuration of the logged-in multi-function device. For instance, if the user logs in into a multi-function device and the multi-function device does not support finishing, then those incomplete jobs in his profile that require finishing are not displayed to the user at that point and other incomplete jobs in his profile are displayed to the user.

At 406, if the incomplete job is compatible with configuration of the logged-in multi-function device, a user interface is automatically presented to the user displaying the incomplete job with one or more options related to the previous incomplete job. The one or more options related to the previous incomplete job include a resume option, a restart option, a remove option and an ignore option.

At 408, the user is allowed to select an option of the one or more displayed options, the one or more options further allow the user to take an action related to the previous incomplete job. At 410, the incomplete job is executed in accordance with the selected option. The incomplete job may be executed from the beginning. Only incomplete portions of the incomplete job may be executed. The incomplete job may be removed from the user profile. A notification related to the incomplete job may be skipped. After the incomplete job is executed successfully, the incomplete job is tagged as a complete job. Thereafter, details associated with the incomplete job (now completed job) are deleted. In this manner, the method allows the user to manage and handle the one or more jobs which are left incomplete due to many reasons/scenarios as discussed above, without requiring the user to re-configure the previous incomplete job.

Figure 5:
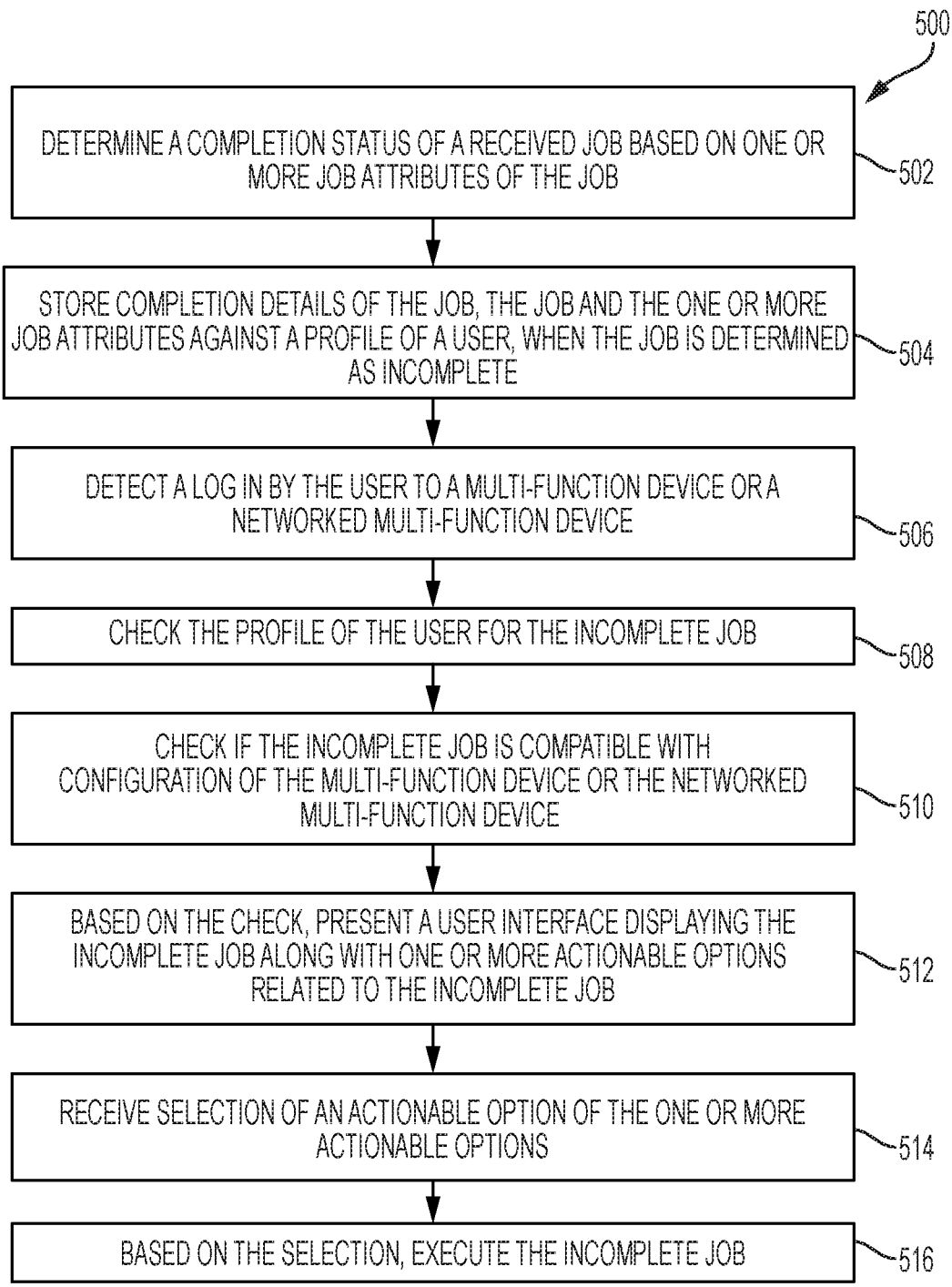
FIG. 5 is a detailed method flowchart for managing one or more incomplete jobs.

FIG. 5 is a method 500 of operating a multi-function device. The method is discussed including storing aspects of an incomplete job and managing the stored incomplete job. The method begins with when a user submits a print job which is received by the multi-function device for printing. The multi-function device starts executing the job. The job is being monitored by the multi-function device at regular intervals for its completion status.

At 502, a completion status of the received job is determined. The job may be determined incomplete based on the one or more job attributes. The job may be determined incomplete when the job may be abruptly terminated, halted, in held state, or accidently deleted. Based on the determination, the job is tagged as incomplete job. When the job is determined as an incomplete job, completion details of the job, the job and the one or more job attributes are stored against a profile of a user, at 504. At 506, a login into the same multi-function device (the multi-function device to which the user has submitted the print job) or a networked multi-function device is detected.

At 508, the profile of the user is checked for the stored incomplete job. If the incomplete job is found listed in the profile of the user, the method moves to block 510. At 510, it is checked if the stored incomplete job is compatible with configuration of the logged-in multi-function device, i.e., the same multi-function device or the networked multi-function device. For example, if the user is logged-in into the same multi-function device, then the stored incomplete job is checked for its compatibility with configuration of the same multi-function device. In another example, if the user is logged-in into the networked multi-function device, then the stored incomplete job is checked for its compatibility with configuration of the networked multi-function device.

At 512, based on the compatibility check, a user interface is automatically presented displaying the incomplete job along with one or more actionable options related to the incomplete job. The one or more actionable actions include a resume option, a restart option, a remove option and a skip option. Other details such as the completion details and the job attributes may be displayed via the user interface. At

514, selection of an actionable option of the one or more actionable options is received. Here, the user can select any of the displayed actionable options and handle the incomplete job as required. For example, if the user wishes to only execute the incomplete portion of the incomplete job, the user may select the option resume. If the user wishes to execute the incomplete job from the beginning, the user may select the restart option. If the user wishes to remove the incomplete job from his profile, the user may select the remove option. If the user wishes to handle the incomplete job later, the user may select the skip option to skip the notification related to the incomplete job. Based on the selection, the incomplete job is executed at 516. In this manner, the incomplete job is finished or completed in the manner the user wants.

Exemplary Scenario

An example is discussed for better understanding of the present disclosure without limiting the scope of the disclosure. It is considered that a user A sends 3 print jobs as job A, job B and job C to a multi-function device (Machine 1) for printing. Job A gets successfully completed. Job B remains incomplete as the job which is directed to a stacker tray (with finishing option—staple) gets delivered to top tray without finishing as the stacker tray is unavailable. Here, the attributes of job B, original image of the document, completion details and current status are stored against the profile of the user as the job B remains incomplete. Job C goes to held state due to media unavailability and the user deletes the held job as he is not satisfied with the received output. Here, the attributes of job C, original image of the document, completion details and current status are stored against the profile of the user as the job C remains incomplete. The user logs off from the multi-function device (machine 1) if the user is already logged-in. At a later point, the user logs in into another multi-function device, i.e., a networked multi-function device, say machine 2 that does not support finishing options. The machine 2 recognizes its configuration and compares it to the list of incomplete jobs in the user's profile. Based on the comparison, the machine 2 only lists/displays job C to the user and provides him with the options to "Resume," "Rerun," "Ignore," or "Remove" for the job C. And job B is not displayed to the user as the Job B is not compatible with the configuration of the networked multi-function device, Machine 2 (i.e., does not support finishing options). Based on the user's selection, the appropriate action is taken. Resume—Complete only the incomplete portions of the job. Restart/Rerun—Begin executing the incompletion job from scratch. Ignore—Close the prompt. Remove—Clear the incomplete job from the user's profile.

Exemplary Snapshot

Figure 6:
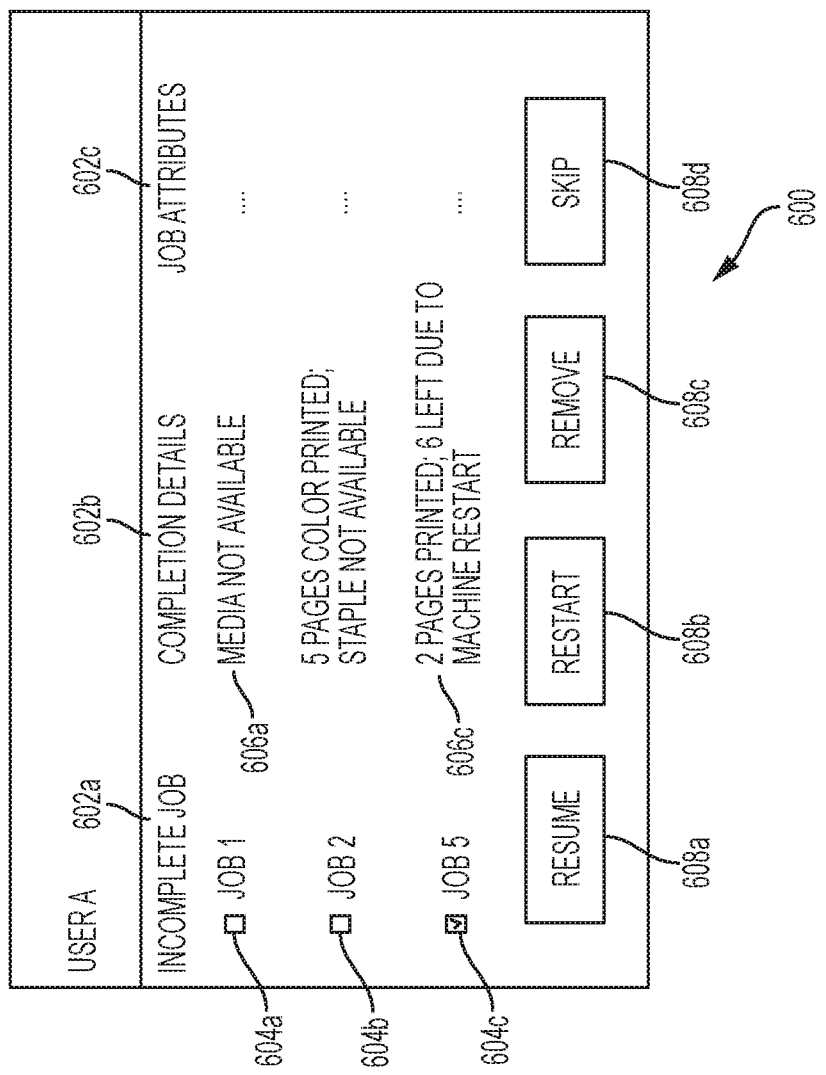
FIG. 6 shows an exemplary user interface depicting an incomplete job and associated details/information.

For better understanding, a user interface 600 is shown in FIG. 6. The user interface 600 displays stored information about an incomplete job. The information is presented when the user logs in into a multi-function device. The information includes an incomplete job 602*a* (the document or the document name), completion details 602*b*, and job attributes 602*c*. Under the column 602*a*, jobs such as 604*a*, 604*b* and 604*c* are listed. Under the column 602*b*, completion details such as 606*a* and 606*c* are shown. The completion details 606*a* indicate media not available. The completion details 606*c* indicate 2 pages are printed and 6 are left due to machine restart. The user interface 600 further shows multiple options as 608*a*, 608*b*, 608*c* and 608*d* to handle the incomplete job. The options include a resume option 608*a*, a restart option 608*b*, a remove option 608*c* and a skip option 608*d*. As further shown, the user checks the box 604*c* and corresponding options 608*a*, 608*b* 608*c* and 608*d* are shown to the user for the job 604*c*. In the user interface 600, multiple incomplete jobs 604*a*, 604*b* and 604*c* are displayed to the user. The user can select any incomplete jobs 604*a*, 604*b* and 604*c* using a checkbox or any other selection mechanism as shown for the incomplete job 604*c*. For each of the incomplete jobs 604*a*, 604*b* and 604*c*, multiple options 608*a*, 608*b* 608*c* and 608*d* are provided for the user to take a user action.

Scanning and Copying Jobs

For easy understanding, the methods and systems are discussed with respect to print jobs but for a person skilled in the art, it is understood the disclosure is equally applicable to scanning, copying and faxing scenarios.

Scenario 1: Scanning from SPDH (Single Pass Document Handler)

Here, the multi-function device 202 includes additional components required for scanning and copying operations. For example, the multi-function device 202 includes a single pass document handler (SPDH) unit (although not shown) including a paper presence detection sensor. The SPDH unit holds multiple originals and automatically scans one sheet after another until the last sheet. The paper presence detection sensor which helps the multi-function device 202 to detect and identify whether any original is remaining to be scanned. For example, when there are multiple originals and if the scan operation halts in the middle, then the multi-function device 202 detects some originals are left to be scanned with the help of paper presence detection sensor. In such scenarios, the multi-function device 202 stores all the already scanned originals and when the user logs back in the same multi-function device 202 or a different but networked multi-function device, the logged-in multi-function device displays multiple options as discussed above to complete the previous incomplete scan job. In this manner, the multi-function device 202 allows the user to finish the previously incomplete scan job too.

Scenario 2: Scanning from Platen

Here, the multi-function device 202 includes a platen unit. The platen scans only one original at a time. After every scan, a user selects either "Next" (to proceed with the next original scan) or "Submit" (to indicate the last original is scanned). When there are multiple originals and if the scan operation halts in the middle, then the multi-function device 202 can detect still some originals are left to be scanned if the user has not chosen the "Submit" option. Accordingly, the multi-function device 202 considers the scan job as an incomplete job. Hence, the multi-function device 202 stores all the already scanned originals and when the user logs in into the same multi-function device 202 or a different but networked multi-function device, the logged-in multi-function device displays multiple options as discussed above to complete the previous incomplete scan job. In this manner, the multi-function device 202 allows the user to finish the previously incomplete scan job too.

Both scan and copy jobs start with scan operation. The copy job delivers the physical output, while in scan job, a digital output/document is delivered. The scanned documents are stored in different formats such as pdf, ps, pcl, xps, jpeg, etc.

In case of a scan job, the scan job is considered incomplete when the multi-function device detects papers in SPDH/platen or if the job is not transferred to a specified location. In case of copy job, the job is considered incomplete if multi-function device has not raised job completion status (by comparing with the job attributes set/received, the multi-function device decides the job status). In addition, all variations to print jobs, scan jobs, copy jobs or fax jobs as know in the art or later developed may be implemented.

The present disclosure discloses methods and systems for managing one or more incomplete jobs. Overall, the present disclosure provides a smart way of reactivation, resumption and finishing of an incomplete job or provides a way to finish his incomplete job with minimal effort. The disclosure optimizes recovery and redirection of jobs that are not produced in whole or in part originally as requested. The disclosure further reduces overall waste through the ability to re-execute only those portions of a job that are not completed elsewhere. The disclosure increases user satisfaction in being able to complete printing of his job on a different printer without having to resubmit the original job. The disclosure focuses on listing compatible incomplete jobs to the user, i.e., compatible with the hardware and software configuration of a multi-function device, thereby providing an effective solution to handle the incomplete job. The disclosure helps in reducing unnecessary prints of a document and further reduces re-use of media and consumable. The present disclosure enhances the overall user experience as it saves the time of the user to reconfigure the incomplete job.

For a person skilled in the art, it is understood that the use of phrase(s) "is," "are," "may," "can," "could," "will," "should," or the like, is for understanding various embodiments of the present disclosure and the phrases do not limit the disclosure or its implementation in any manner.

It is emphasized that the term "comprises" or "comprising" is used in this specification to specify the presence of stated features, integers, steps or components, but does not preclude the addition of one or more further features, integers, steps or components, or groups thereof.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "checking," or "detecting," or "storing," or "receiving," or "allowing," or "executing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of operating a multi-function device capable of processing a plurality of jobs, the method comprising:
   receiving, by one or more processors of the multi-function device, a job from a user along with one or more job attributes;
   initiating, by the one or more processors, execution of the job;
   determining, by the one or more processors, a completion status of the job based on the one or more job attributes;
   when the job is determined as incomplete, storing, by a memory of the multi-function device, completion details of the job, the job, and the one or more job attributes against a profile of the user, such that details related to the incomplete job are accessible when the user logs into the multi-function device or a networked multi-function device; and
   in response to determining that the incomplete job is compatible with a configuration of one or both of the multi-function device and the networked multi-function device, presenting, by a user interface of the multi-function device or the networked multi-function device, the incomplete job to the user along with one or more actionable options, when the user logs in to the multi-function device or the networked multi-function device; and
   allowing, through the user interface, the user to take action on the presented incomplete job, based on the one or more actionable options.

2. The method of claim 1, further comprising tagging, by the one or more processors, the job as incomplete based on the determination.

3. The method of claim 1, wherein storing the completion details comprises storing completed portions of the incomplete job and storing incomplete portions of the incomplete job.

4. The method of claim 1, further comprising based on the user action, performing one or more of executing the incomplete job again, executing only incomplete portions of the incomplete job, removing the incomplete job from the user profile, and skipping a notification related to the incomplete job.

5. The method of claim 1, wherein the stored completion details of the job are used for one or both of reinitiating execution of the incomplete job again and execution of only incomplete portions of the incomplete job.

6. The method of claim 1, further comprising:
   checking, by the one or more processors or by one or more processors of the networked multi-function device, the user profile for the stored job when the user logs into the multi-function device or the networked multi-function device;
   based on the check, performing, by the one or more processors or by those of the networked multi-function device, the determination that the incomplete job is compatible with configuration of the logged-in multi-function device;
   receiving, through the user interface, a selection of the one or more actionable options by the user; and
   executing the incomplete job in accordance with the selected one or more actionable options,
   wherein the incomplete job is handled, by the multi-function device or the networked multi-function device, without requiring the user to reconfigure the incomplete job.

7. The method of claim 6, wherein the one or more actionable options comprise a resume option, a restart option, a remove option, and an ignore option.

8. The method of claim 7, wherein the resume option is selected and comprises executing only incomplete portions of the incomplete job.

9. The method of claim 7, wherein the restart option is selected and comprises executing the incomplete job again.

10. The method of claim 7, wherein the remove option is selected and comprises removing the incomplete job from the profile of the user.

11. A multi-function device, comprising:
    one or more processors configured to:
       receive a job from a user along with one or more job attributes,
       initiate execution of the job, and
       determine a completion status of the job based on the one or more job attributes after initiating execution of the job;
    a memory configured to store completion details of the job, the job, and the one or more job attributes against a profile of the user, when the job is determined as an incomplete job, such that details related to the incomplete job are accessible when the user logs into the multi-function device or a networked multi-function device; and
    a user interface configured to:
       in response to determining that the incomplete job is compatible with a configuration of one or both of the multi-function device and the networked multi-function device, present the incomplete job to the user along with one or more actionable options, when the user logs into the multi-function device; and allow the user to take an action on the presented incomplete job, based on the one or more actionable options.

12. The multi-function device of claim 11, wherein the one or more processors are further configured to tag the job as an incomplete job based on the determination.

13. The multi-function device of claim 11, wherein the one or more actionable options comprise a resume option, a restart option, a remove option, and an ignore option.

14. The multi-function device of claim 11, wherein the one or more processors are further configured to execute only incomplete portions of the incomplete job.

15. The multi-function device of claim 11, wherein the one or more processors are further configured to reinitiate execution of the incomplete job.

16. The multi-function device of claim 11, wherein the one or more processors are further configured to remove the incomplete job from the profile of the user.

17. The multi-function device of claim 11, wherein the one or more processors are further configured to skip a notification related to the incomplete job.

18. The multi-function device of claim 11, wherein the one or more job attributes and the completion details of the incomplete job are stored only for the incomplete job.

19. The multi-function device of claim 11, wherein the one or more processors are further configured to check whether the incomplete job is compatible with the configuration of the logged-in multi-function device, before presenting the incomplete job to the user.

20. A method of operating a multi-function device, the method comprising:

determining, by one or more processors of the multi-function device, a completion status of a received job based on one or more job attributes of the job;

storing, in a memory completion details of the job, the job, and the one or more job attributes against a profile of a user, when the job is determined as an incomplete job, execution of the incomplete job having been initiated, wherein the memory is connected via a network to a plurality of networked multi-function devices comprising the multi-function device such that details related to the incomplete job are accessible from the memory when the user logs into the multi-function device or another networked multi-function device of the plurality;

detecting, by the one or more processors of the multi-function device or by one or more processors of the other multi-function device of the plurality, a login by the user into the multi-function device or the other networked multi-function device of the plurality;

checking, by the one or more processors of the multi-function device or by the one or more processors of the other multi-function device of the plurality, the profile of the user for the stored job;

checking, by the one or more processors of the multi-function device or by the one or more processors of the other multi-function device of the plurality, if the incomplete job is compatible with a configuration of the logged-in multi-function device;

based on determining that the incomplete job is compatible with the configuration of the logged-in multi-function device, presenting a user interface displaying the incomplete job along with one or more actionable options related to the incomplete job;

receiving selection of an actionable option, through the user interface, of the one or more actionable options; and executing the incomplete job in accordance with the selection.

21. The method of claim 20, wherein the one or more actionable options comprise a resume option, a restart option, a remove option, and an ignore option.

* * * * *